(No Model.)
A. N. BENDER & J. J. SCHOENECKER.
FLY TRAP.
No. 511,108. Patented Dec. 19, 1893.
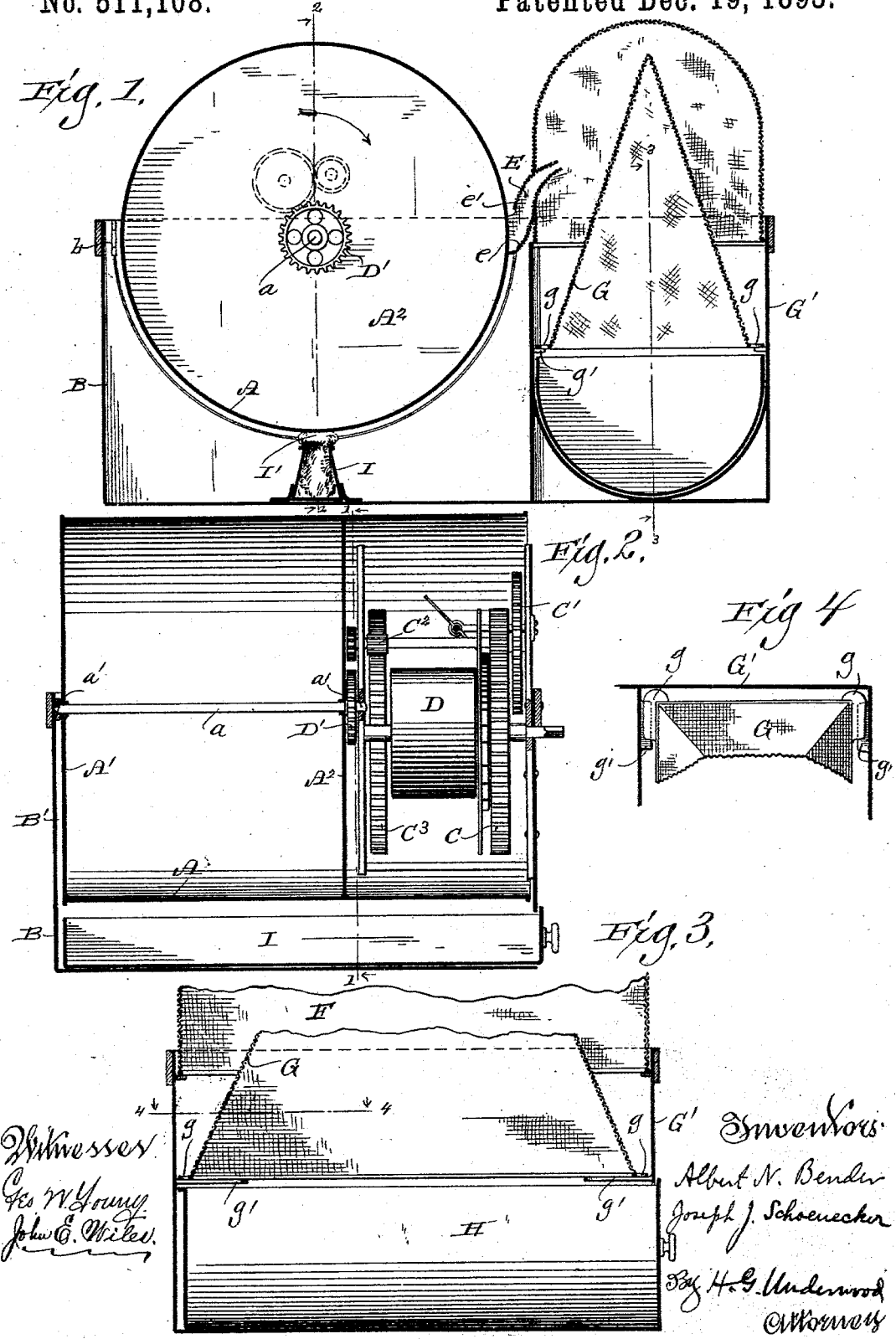

UNITED STATES PATENT OFFICE.

ALBERT N. BENDER AND JOSEPH J. SCHOENECKER, OF MILWAUKEE, WISCONSIN.

FLY-TRAP.

SPECIFICATION forming part of Letters Patent No. 511,108, dated December 19, 1893.

Application filed April 8, 1893. Serial No. 469,534. (No model.)

*To all whom it may concern:*

Be it known that we, ALBERT N. BENDER and JOSEPH J. SCHOENECKER, both citizens of the United States, and residents of Milwaukee, in the county of Milwaukee, and in the State of Wisconsin, have invented certain new and useful Improvements in Fly-Traps; and we do hereby declare that the following is a full, clear, and exact description thereof.

Our invention relates to new and useful improvements in fly traps, and consists in the matters hereinafter described and pointed out in the appended claims.

In the accompanying drawings, illustrating our invention:—Figure 1 is a vertical longitudinal sectional view taken on line 1—1 of Fig. 2. Fig. 2 is a transverse vertical sectional view taken on line 2—2 of Fig. 1. Fig. 3 is a similar view taken on line 3—3 of Fig. 1. Fig. 4 is a detail horizontal sectional view taken on line 4—4 of Fig. 3.

Referring by letter to the drawings, A designates a horizontally disposed cylinder which is mounted upon a central shaft $a$. Heads $A'$ $A^2$ are conveniently arranged to extend across the cylinder A and are rigidly secured to the shaft $a$ as shown. The shaft $a$ is revolubly journaled in a suitable frame or casing B as at $a'$ $a^2$.

Any desired mechanism may be provided for giving a continuous rotation to the drum or cylinder A, as for instance the motor shown in Fig. 2 which comprises gears C C' $C^2$ $C^3$, &c., actuated by a spring D, and one of said gears is arranged to engage with a gear D' upon the inner end of the shaft $a$.

The drum or cylinder A is arranged to be rotated in the direction indicated by the arrow in Fig. 1. At a convenient point adjacent to the periphery of the drum A is provided an oblique passage E, one wall $e$ of which terminates in close proximity to the surface of the drum as shown, and the other wall $e'$ terminates at some distance from the surface of said drum. This passage E extends upwardly into a suitable housing or receptacle F, which is conveniently made from wire cloth. The walls of the passage E may likewise be made of wire cloth if desired. Within the housing or receptacle F is provided a pyramidal deflecting body G likewise conveniently made from wire cloth which extends downwardly upon the inside of a suitable casing G' and is provided at its corners with lugs $g$ $g$ arranged to engage with suitable supporting lugs or shoulders $g'$ $g'$, the lower edges of the pyramidal body G, between the lugs $g$ $g$ being arranged to terminate at some distance from the walls of the casing G' as shown. Within the lower part of the casing G' is provided a removable drawer H having a suitable handle $h$ as shown. This deflecting body G must be wholly closed at the top, so as to prevent the upward passage therethrough of any insects which might fly or crawl up from the drawer H, to which they have dropped through the apertures leading from the receptacle F to the compartment in the casing G' below said receptacle containing said drawer, these apertures being the openings or spaces between the lower edge of the pyramidal deflector G and the walls of said casing.

The operation of our improved device is as follows: The outside of the drum or cylinder A is covered with some substance attractive to flies, or if desired may be covered with a cloth saturated with such material. The apparatus is placed in some location where the flies collect and the motor set in motion so as to give a continuous rotation to the drum A. Flies which may be attracted by the material upon the drum and which alight upon the outside of the same will be carried around by the rotation of said drum until they reach the passage E, when they will be brought into contact with the lower wall $e$ of said passage and forced to leave the surface of the drum. The most convenient path for the flies after leaving the drum, is through the oblique passage E to the interior of the housing or receptacle F, and said passage is preferably made somewhat tapering or contracted toward its upper end, as shown, the outlet from said passage into the receptacle F being of just sufficient width to permit of the ready egress of said flies from said passage. The flies which enter the receptacle F are unable to escape therefrom and hence remain and die in said receptacle and as they drop to the bottom of the same, are directed by the inclined walls of the deflecting body G, through the spaces between the lower edges of said body and the wall of the housing G', dropping from thence into drawer H. The drawer H may be removed from time to time to empty out an accumulation of dead flies.

If it is desired to maintain the surface of the drum in a moist condition, a suitable drawer or trough I may be located within the casing beneath the drum and a sponge I' saturated with water or sweetened liquid located in said drawer or trough and held in contact with the surface of the drum. This drawer I is conveniently provided with a handle $i$ for withdrawing it from the casing.

It may be necessary at times to remove the drum from the casing, and for convenience of removal, the axle $a$ is removably journaled at $a^2$ in the motor frame, the opposite end of said shaft being journaled at $a'$ in a hinged end piece B' which is hinged to the casing B at $b$. By this construction when it is desired to remove the drum or cylinder, the end piece B' may be swung back upon the hinge $b$ to free the shaft $a$, when the drum may be withdrawn from the casing in an obvious manner.

We find our improved device very efficacious in exterminating flies and other insects.

While we have shown and described our improved device as provided with a rotating drum to which the material attractive to the flies is applied, yet we would have it understood that in place of said drum any other desired device may be employed, which presents a continuous moving surface. Thus an endless apron carried by suitable rollers might be substituted for the drum, and would perform precisely the same functions. Furthermore, while we have described our improved device as especially adapted for use as a fly trap, yet we would have it understood that our said device may be used for other purposes and we contemplate the employment of the described apparatus wherever a continuous moving surface is required.

Having thus described our invention, what we claim as new, and desire to secure by Letters Patent, is—

1. A fly trap comprising a body adapted to present a continuous moving surface which is adapted to receive a covering of material attractive to flies, suitable means for actuating said body, a receptacle for flies, a closed pyramidal deflector within said receptacle, a compartment located beneath said receptacle, apertures leading from said receptacle to said compartment, and a passage extending to the inside of said receptacle and terminating adjacent to the surface of said body, substantially as set forth.

2. A fly trap comprising a body adapted to present a continuous moving surface which is adapted to receive a covering of material attractive to flies, suitable means for actuating said body, a receptacle for flies, a closed pyramidal deflector within said receptacle, a compartment located beneath said receptacle, apertures leading from said receptacle to said compartment, a removable drawer in said compartment, and a passage extending to the inside of said receptacle and terminating adjacent to the surface of said body, substantially as set forth.

3. A fly trap comprising a revoluble drum adapted to receive a coating of material attractive to flies, a suitable motor for giving a continuous rotation to said drum, a receptacle for flies adjacent to said drum, an upwardly projecting oblique passage between the exterior of said drum and the interior of said receptacle, the lower wall of said passage being in close proximity to said drum throughout its length, and the upper wall at a greater distance from said drum, and the inner mouth of said passage within the receptacle being contracted, a closed pyramidal deflecting body within said receptacle rising above the plane of said passage, a removable drawer below said pyramidal body, and apertures around and outside the base of the latter leading to said drawer, substantially as set forth.

In testimony that we claim the foregoing we have hereunto set our hands, at Milwaukee, in the county of Milwaukee and State of Wisconsin, in the presence of two witnesses.

ALBERT N. BENDER.
JOSEPH J. SCHOENECKER.

Witnesses:
JOHN E. WILES,
N. E. OLIPHANT.